US006682822B2

(12) United States Patent
Cretekos et al.

(10) Patent No.: US 6,682,822 B2
(45) Date of Patent: *Jan. 27, 2004

(54) MULTILAYER POLYMERIC FILM

(75) Inventors: George F. Cretekos, Farmington, NY (US); Robert A. Migliorini, Victor, NY (US)

(73) Assignee: Exxon Mobil Oil Corporation, Fairfax, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 47 days.

(21) Appl. No.: 09/321,319

(22) Filed: May 27, 1999

(65) Prior Publication Data

US 2002/0064646 A1 May 30, 2002

(51) Int. Cl.[7] ................................................ B32B 27/32
(52) U.S. Cl. ................... 428/447; 428/516; 264/173.15
(58) Field of Search ................................ 428/447, 516; 264/173.15, 290.2

(56) References Cited

U.S. PATENT DOCUMENTS

| 4,659,612 | A | | 4/1987 | Balloni et al. | 428/213 |
|---|---|---|---|---|---|
| 4,692,379 | A | | 9/1987 | Keung et al. | 428/349 |
| 4,734,317 | A | | 3/1988 | Bothe et al. | 428/215 |
| 4,925,728 | A | | 5/1990 | Crass et al. | 428/216 |
| 5,482,780 | A | | 1/1996 | Wilkie et al. | 428/515 |
| 5,489,473 | A | | 2/1996 | Wilkie | 428/323 |
| 5,792,549 | A | | 8/1998 | Wilkie | 428/215 |
| 5,798,174 | A | | 8/1998 | Wilkie | 428/347 |
| 5,840,419 | A | | 11/1998 | Alder | 428/327 |
| 5,985,426 | A | | 11/1999 | Wilkie | 428/215 |
| 6,096,843 | A | * | 8/2000 | Saito et al. | 526/127 |

FOREIGN PATENT DOCUMENTS

| EP | 0273680 | 7/1988 |
|---|---|---|
| WO | WO9856662 | 12/1998 |

* cited by examiner

Primary Examiner—D. Lawrence Tarazano
(74) Attorney, Agent, or Firm—Rick F. James

(57) ABSTRACT

A multilayer polymeric film comprises:
(a) a core layer comprising a thermoplastic polymer and optionally an antistatic agent, the core layer having a first side and a second side;
(b) a functional layer which is printable or sealable or treatable for printing or sealing on the first side of the core layer; and
(c) an additional layer on the second side of the core layer comprising a polypropylene homopolymer, a solid antiblock, and silicone oil. The film has a stable coefficient of friction and release character in spite of mishandling during treatment.

10 Claims, No Drawings

MULTILAYER POLYMERIC FILM

FIELD OF THE INVENTION

The present invention relates to a multilayer polymeric film. More particularly, the present invention relates to an improved multilayer polymeric film in which the coefficient of friction (COF) and the release character of the film are less susceptible to, or more resistant to, handling or mishandling during further treatment of the film by various users (e.g., converters). Additionally, the present invention relates to cold seal release films comprising such improved multilayer polymeric films.

BACKGROUND OF THE INVENTION

Multilayer polymeric films are used to manufacture cold seal release films that may be reverse-printed and laminated to a variety of substrates. In certain applications, it may be desirable to treat (e.g., by corona or flame treatment) a surface (e.g., the print face) of the multilayer polymeric film. During the treatment, however, the opposite surface (i.e., the release face) may be treated in addition to, or instead of, the intended surface through so-called "backside treatment" or through operator error. Such handling or mishandling may detrimentally affect the COF and release character of the film.

Thus, it would be desirable to provide a multilayer polymeric film that is less susceptible to, or more resilient to, the above-described "backside treatment" or mishandling by the operator. That is, it would be desirable to provide a multilayer layer polymeric film that possesses a stable COF and good release character in spite of such treatment or mishandling.

The present invention provides an effective solution to the above-described problem.

U.S. Pat. No. 4,692,379 to Keung, et al. discloses a film having an upper heat sealable layer formed from an ethylene-propylene-containing copolymer or terpolymer and an antiblocking agent and a lower heat sealable layer formed from an ethylene-propylene-containing copolymer or terpolymer and antiblocking agent and a quantity of silicone oil such that the coefficient of friction-reducing amount of the silicone oil will be present on an exposed surface of the upper heat sealable layer following mutual contact of the upper and lower surfaces. The silicone oil additive is described as having a viscosity of from about 350 to about 100,000 centistokes, with about 10,000 to about 30,000 centistokes being preferred. An advantage of the invention as described in the '379 patent is that the silicone is present on the exposed surface of the lower layer in discrete microglobules which, to some extent, transfer to the upper surface upon contact. The silicone on the surfaces of the film facilitates machinability.

U.S. Pat. No. 4,734,317 to Bothe, et al. discloses a biaxially oriented multilayer polyolefin film which comprises a polypropylene base layer, a first polyolefin sealing layer positioned on one side of the base layer, and containing from about 0.5% to 3% by weight of incorporated polydialkylsiloxane, the first sealing layer not being subject to corona treatment, and a second polyolefin sealing layer positioned on the other side of the base layer and having a coating of the polydialkylsiloxane on its outer surface, the second sealing layer being subject to corona treatment, wherein the polydialkylsiloxane coating is formed by contact of the first and second layers.

U.S. Pat. No. 4,925,728 to Crass, et al. discloses a biaxially stretched multilayer film comprising a base layer essentially comprising polypropylene and at least one top layer, wherein the top layer essentially comprises (a) 98.5% to 99.6% by weight of a propylene homopolymer and (b) 0.4% to 1.5% by weight of a polydiorganosiloxane, relative to the top layer.

U.S. Pat. No. 5,482,780 to Wilkie, et al. discloses a polypropylene film with cold seal release and cold seal receptive surfaces, wherein a predominantly isotactic polypropylene homopolymer core has on one side thereof an ethylene-propylene random copolymer having a physically modified surface for reception of a cold seal cohesive composition and on the other side of the core there is a blend of an ethylene-butylene copolymer and an ethylene-propylene random copolymer containing a non-migratory slip agent. The preferred non-migratory slip agent is described as being a crosslinked silicone having a particle size of about 1 to 4.5 microns, such as that identified by TOSPEARL of Toshiba Company.

U.S. Pat. No. 5,489,473 to Wilkie discloses biaxially oriented polypropylene cold seal packaging films comprising at least one cold seal release layer and a cold seal receptive layer. The use of crosslinked silicone in the cold seal release skin layer is also disclosed.

U.S. Pat. No. 5,792,549 to Wilkie discloses a coextruded biaxially oriented polyolefin packaging film comprising a cold seal release layer, a core layer, and a cold seal receptive skin layer. The use of crosslinked silicone having a particle size of about 1 to about 4.5 microns such as that identified by TOSPEARL of Toshiba Company is also disclosed.

U.S. Pat. No. 5,798,174 to Wilkie discloses cold sealable films for heat sensitive packaging operations comprising, in order, a cold seal cohesive layer, a core layer, and a cold seal release layer comprising a mixture of about 1 to about 80% by weight butene-propylene copolymer and about 99 to 20% by weight butylene-ethylene copolymer.

U.S. Pat. No. 5,840,419 to Alder discloses a multilayer polyolefin film comprising a core layer of a propylene polymer and an outer polyolefin layer on the core layer, the outer polyolefin layer including a coefficient reducing amount of a particulate, partially crosslinked polysiloxane, which are preferably in the form of elastomeric particles including polysiloxane in the form of silicone oil. The patent states that the silicone oil is released when the particles are "subjected to mechanical stress."

SUMMARY OF THE INVENTION

The present invention is directed to a multilayer polymeric film comprising:

(a) a core layer comprising a thermoplastic polymer and optionally an antistatic agent, the core layer having a first side and a second side;

(b) a functional layer which is printable or sealable or treatable for printing or sealing on the first side of the core layer; and (c) an additional layer on the second side of the core layer comprising a polypropylene homopolymer, a solid antiblock, and silicone oil.

In another embodiment, the present invention relates to a cold seal release film comprising:

(a) a core layer comprising a thermoplastic polymer and optionally an antistatic agent, the core layer having a first side and a second side;

(b) a functional layer which is printable or sealable or treatable for printing or sealing on the first side of the core layer; and (c) an additional layer on the second side of the core layer comprising a polypropylene homopolymer, a solid antiblock, and silicone oil.

In yet another embodiment, the present invention provides a process for producing a multilayer polymeric film comprising:

(a) coextruding a core layer comprising a thermoplastic polymer and optionally an antistatic agent, a functional layer which is printable or sealable or treatable for printing or sealing, and an additional layer comprising a polypropylene homopolymer, a solid antiblock, and silicone oil;

(b) cooling the coextruded film; and (c) optionally orienting the film in at least the machine and/or transverse directions.

It has been found that the present invention provides a multilayer polymeric film which exhibits a stable COF and good release character, even when the film is subjected to treatment or mishandling known to detrimentally affect COF and release character.

DETAILED DESCRIPTION OF THE INVENTION

The core layer comprises a thermoplastic polymer which has properties suitable for extrusion or coextrusion followed by biaxial orientation in the machine and transverse directions under elevated temperature so as to form a multi-layer film. Although the preferred thermoplastic polymer of the core layer is a polypropylene homopolymer, other polymers may be used. These polymers include any polymer made from a 2 to 4 carbon atom olefin, such as ethylene or butene-1, or a polymer made predominantly of propylene with minor amounts of another olefin, usually a 2 to 4 carbon atom olefin.

Optionally, the core layer comprises an antistatic agent in addition to the thermoplastic polymer. The antistatic agent may be selected from, e.g., glycerol monostearate (GMS) and a blend of GMS and tertiary amine. Suitable amounts for the antistatic agent may range from about 0.05% to about 3 weight %, based upon on the weight of the core layer.

The functional layer may comprise a polymer having properties suitable for extrusion and uniaxial or biaxial orientation (by stretching the extrudate in the machine and/or transverse directions under elevated temperatures) and for forming skin layers on the outer surfaces of the core layer. Suitable polymers include an olefinic polymer, such as polypropylene or polyethylene. Other suitable polymers include a copolymer or terpolymer of ethylene, propylene and/or butylene and/or another olefin having 5 to 10 carbon atoms or a mixture of these olefin polymers. Preferably, the functional layer comprises an ethylene homopolymer having a density of about 0.91 to about 0.96 g/cm$^3$, an ethylene-propylene copolymer in which the ethylene content is about 2 to about 10% by weight based upon the total weight of the copolymer, or an ethylene-propylene-butylene terpolymer in which the ethylene content is about 0.5 to about 7 weight % ethylene and about 5 to about 30 weight % butylene, each based upon the total weight of the terpolymer.

The additional layer of the present invention is comprised of a polypropylene homopolymer.

It has been discovered that it may be particularly advantageous to use a highly crystalline polypropylene (HCPP) as the polypropylene homopolymer contained in the additional layer. We have found that the use of HCPP provides additional benefits, including an overall improvement in the release properties of the film. HCPP polypropylene polymers include those having a decalin solubles content of about 1 to about 5% by weight, meso pentads equal to or greater than about 85% ($^{13}$C NMR spectroscopy), and a melt flow of about 2.5 to about 3 (as measured according to the standard ASTM D1238 test for polypropylene).

Suitable commercially available HCPP polymers include, but are not limited to, Amoco 9218 HCPP resin from BP-Amoco.

The additional layer of the present invention also contains a solid antiblock. The solid antiblocks of the present invention are such that they do not substantially break up when subjected to mechanical stress like the particulate, partially cross-linked polysiloxanes described in U.S. Pat. No. 5,840,419. Suitable antiblocks include, but are not limited to, fully crosslinked or non-meltable polysiloxane, polymethyl methacrylate (PMMA) particles such as EPOSTAR® MA-1002 or silica particles such as SYLOBLOC 44 from W. R. Grace.

In a preferred embodiment, the solid antiblock is present in the form of spherical particulates. Preferably, the solid antiblock is a fully crosslinked or non-meltable polysiloxane, which in combination with the silicone oil, provides a multilayer film having the desired properties according to the present invention. In a most preferred embodiment, the fully crosslinked or non-meltable polysiloxane is polymethylsilsesquioxane, which comes in a spherical powder form having an average particle size of from about 2 $\mu$m to about 6 $\mu$m. These materials are completely solid with no known melting point.

Suitable fully crosslinked or non-meltable polysiloxanes include, but are not limited to, TOSPEARL T120A, which is a fully crosslinked, non-meltable silicone resin powder available from Toshiba Silicone Company, Ltd.

The solid antiblock may be incorporated into the additional layer in an amount ranging from about 0.1 to about 0.5% by weight, preferably from about 0.15 to about 0.30% by weight, based on the entire weight of the additional layer.

The additional layer of the present invention also contains silicone oil, e.g. polydimethylsiloxane. The silicone oil used may range from about 1,000 centistoke (cs) viscosity to about 100,000 cs viscosity. The preferred silicone oils are those having a viscosity of about 30,000 to about 60,000 cs, such as 20/30,0000 polydimethylsiloxane fluid from Dow-Corning or 200/60,0000 polydimethylsiloxane fluid from Dow-Corning.

The silicone oil may be incorporated into the additional layer in an amount ranging from about 0.1 to about 2% by weight, preferably from about 0.2 to about 0.8% by weight, based on the entire weight of the additional layer.

The functional layer includes those thermoplastic polymer skin layers suitable for being treated for printing or sealing or by being a thermoplastic polymer which is printable or sealable without treatment. As mentioned previously, the functional layer may be selected from the group consisting of ethylene or propylene homopolymer, ethylene-propylene copolymer or ethylene-propylene-butylene terpolymer or a mixture of two or more of such homopolymer, copolymer or terpolymer. In one embodiment of the invention, the surface of the functional layer is treated by surface treatment which improves wettability and adhesion of printed matter (print may be by lithography, liquid or dry toner, thermal dyes, dye sublimation, etc.). In another embodiment of the invention, the functional layer is a cold seal adhesion promoting layer.

It is contemplated that the additional layer will provide excellent antiblocking properties to any commercially applied cold seal receptive composition or print receptive surface.

The functional layer may itself be printable or sealable or may be treated so as to provide sealability and/or printability. This includes surface treatment of any kind known to enhance the surface tension properties such as flame or corona treatment. Other treatment methods include the application of a printable or sealable covering layer by way of any conventional extrusion or coating method. Certain water-based coatings are known for their utility as cold-sealable coatings or printable coatings. Examples include acrylic-based coatings including alkyl acrylate polymers and copolymers.

Sometimes it is useful to enhance or provide the film with certain properties by use of appropriate film additives. Such additives are used in effective amounts, which vary depending upon the property required, and are, typically selected from the group consisting of: antistatic, antiblock, slip, antioxidant, moisture or gas barrier additive. These additives may be added to one or more layers of the film according to the present invention.

Useful antistatic additives which can be used in amounts ranging from about 0.05 to about 3 weight %, based upon the weight of the layer, include alkali metal sulfonates, polyether-modified polydiorganosiloxanes, polyalkylphenylsiloxanes and tertiary amines. As discussed previously for the core layer, the antistatic agent may be GMS or a blend of GMS and tertiary amine.

Useful antiblock additives used in amounts ranging from about 0.1 weight % to about 3 weight % based upon the entire weight of the layer include inorganic particulates such as silicon dioxide, e.g. a particulate antiblock sold by W.R. Grace under the trademark SYLOBLOC 44, Sipernat from Degussa, calcium carbonate, magnesium silicate, aluminum silicate, calcium phosphate, and the like (e.g. KAOPOLITE). Another useful particulate antiblock agent is TOSPEARL made by Toshiba Silicone Co., Ltd. and is described in U.S. Pat. No. 4,769,418. Another useful antiblock additive is a spherical particle made from methyl methacrylate resin having an average diameter of 1 to 15 microns, and such an additive is sold under the trademark EPOSTAR and is commercially available from Nippon Shokubai. Experimental results show that with addition of particulate antiblock additives such as EPOSTAR MA1002-1010, TOSPEARL 145, KAOPOLITE 1152, SYLOBLOC 44 do not materially effect release property of the film but do reduce the coefficient of friction properties of the film.

Typical slip additives include higher aliphatic acid amides, higher aliphatic acid esters, waxes and metal soaps, which can be used in amounts ranging from about 0.1 to about 2 weight percent based on the total weight of the layer. A specific example of a useful fatty amide slip additive is erucamide. Useful antioxidants are, generally used in amounts ranging from about 0.1 weight % to about 2 weight percent, based on the total weight of the layer, phenolic antioxidants. One useful antioxidant is commercially available under the trademark IRGANOX 1010.

Barrier additives are used in useful amounts and may include low-molecular weight resins, hydrocarbon resins, particularly petroleum resins, styrene resins, cyclopentadiene resins and terpene resins.

Optionally, the outer layers are compounded with a wax for lubricity. Amounts of wax range from about 2 to about 15 weight % based on the total weight of the layer.

In the present invention, the cold seal release film may also comprise additional coatings and/or layers such as an adhesive layer (e.g., a water-based urethane coating), a metallized polyester layer, and/or a cold seal layer (e.g., Technical Coatings 30061A, which is a pattern applied coating comprising polyisoprene and ethylene-vinyl acetate copolymer), as is well known in the art.

Typically, the film is formed by coextruding the thermoplastic polymer-containing core layer together with the additional and functional layers through a flat sheet extruder die at a temperature ranging from between about 200 to about 275° C., casting the film onto a cooling drum and quenching the film. The sheet is then stretched about 4 to about 6 times in the machine direction (MD) orienter followed by stretching about 6 to about 10 times in the transverse direction (TD) orienter. The film is then wound onto a reel. Optionally, one of the external surfaces is coated or flame or corona treated before winding (i.e., the surface of the functional layer). In addition, the production process may also be modified to include an adhesive layer on one or both surfaces of the multilayer polymeric film, a metallized polyester layer, and a cold seal layer.

In general, the film of the instant invention comprises at least three layers: the core layer, the additional layer (usually the outermost skin layer), and the layer which is functional (also usually the outermost skin later). However, it is contemplated that intermediate layers can be incorporated between the core layer and the outermost skin layers. The core layer usually represents about 70 to about 90 percent of the thickness of the total multilayer polymeric film. The skin layers are usually coextensively applied to each major surface of the core layer, typically by coextrusion, as noted above. As indicated previously, however, the additional layer or the functional layer may not, ultimately, be the outermost layers.

EXAMPLES

In each of the examples, the COF was measured in accordance with ASTM 1894 using a Testing Machine Inc. (TMI) instrument. The static and kinetic COF's were recorded. Release was evaluated by unwinding a converted roll and empirically evaluating the force required for unwinding. Specifically, "Release (Hot)" was measured on films that were left for one month as rolls in a room maintained at 125° F. and 10% relative humidity. "Release (Ambient)" was measured on films that were stored for one month at about 70° F. and 50% relative humidity. Cold seal bond strength was determined by pattern coating a cold seal coating (Technical Coatings product "30061A"), then forming a crimp seal by contacting the sealable surfaces (0.75 seconds, 20 psi, 137.0 kPa) together and pulling the seal apart in an Instron type test machine which measures the force needed to separate the seal.

Example 1

A coextruded biaxially oriented three layer film was made having a core layer of about 16.5 microns thickness, an additional layer (release face) of about 1.25 microns thickness, and a functional layer (print face) of about 0.5 micron thickness. Specifically, the core layer was coextruded from a commercially available polypropylene (Fina 3371 from Fina Oil and Chemical Company) with an additional layer comprising BP-Amoco 9218 HCPP resin, 2000 ppmw of a silicone oil having a viscosity of 30,000 centistokes (Dow-Corning 200/30,000 fluid), and 2000 ppm of TOSPEARL T120A (a crosslinked, non-meltable silicone resin powder available from Toshiba Silicone Company, Ltd.) and a functional layer containing EQUISTAR 6030 (a high density polyethylene available from EQUISTAR. The film above was laminated to a metallized polyester film using a water-based urethane adhesive. Cold seal (TC 30061A) was pattern applied to the laminated structure on the PET face. The release film was then corona treated during the lamination process on both faces and COF properties were measured.

The properties of the film are tabulated in Table 1 below.

Comparative Example 1

Example 1 was repeated, except the three layer film was replaced with AET75RLS, which is a polypropylene film containing an antiblocking agent and erucic acid amide.

The properties of the film are reported in Table 1 below.

Comparative Example 2

Example 1 was repeated, except the release face (i.e., the additional layer) comprised a non-HCPP polypropylene (Exxon 4252 from Exxon Corporation), 2500 ppm of silicon spheres having an average particle size of 2 microns (KMP590 from Shin Etsu Company), and a high molecular weight silicone gum (MB50-001 from Dow Corning Corporation).

The properties of the film are reported in Table 1 on the following page.

TABLE 1

| Example | COF Static | COF Kinetic | Release (Hot) | Release (Ambient) | Cold Seal Bond Strength (g/25 mm) |
|---|---|---|---|---|---|
| Ex. 1 | 0.35 | 0.31 | Good | Good | 445 |
| Comp. Ex. 1 | 0.56 | 0.57 | Fair | Good | 460 |
| Comp. Ex. 2 | 0.82 | 0.82 | Fair | Good | 459 |

Table 1 shows that the present invention containing silicone oil in the additional layer not only maintains or improves the release characteristics, but also provides a very low COF relative to the comparative examples after lamination. There is also no evidence of cold seal deadening (i.e., reduction in cold seal bond force) due to any contamination by the silicone oil.

Example 2

Example 1 was repeated, except that the release face was untreated and contained Fina 3371, 2% by weight Dow Corning MB 50-001 silicone gum, and 2000 ppm Shin Etsu KMP-590.

The 24 hour blocking of the film was then measured by cutting 2" strips of the film and placing the release face against a cold seal sample (30061A from Technical Coatings) and applying pressure and heat. The force required to peel the film from the cold seal was then determined using an Instron. The results are set forth in Table 2.

Example 3

Example 1 was repeated, except the release face was untreated and contained Exxon 4612 (polypropylene resin having a decalin solubles content of 4% by weight), 1.5% by weight of Dow Corning MB 50-001 silicone gum, and 1600 ppm Shin Etsu KMP-590.

The results are set forth in Table 2.

Example 4

Example 3 was repeated, except that the release face was flame treated.

The results are set forth in Table 2.

Example 5

Example 3 was repeated, except that Exxon 4612 was replaced with Amoco 9218 HCPP resin having a 2% by weight decalin solubles content.

The results are set forth in Table 2.

Example 6

Example 5 was repeated, except that the release face was flame treated.

The results are set forth in Table 2.

TABLE 2

| Example | 24 Hour Blocking at 100 psi/100° F. (Release to Cold Seal) in g/in |
|---|---|
| 2 | 67 |
| 3 | 52 |
| 4 | 63 |
| 5 | 44 |
| 6 | 63 |

Table 2 shows that the treatment generally increases the release force when using the 24 hour test. See Examples 4 and 6. As the crystallinity of the polymer in the release face increases, the 24 hour blocking decreases on the untreated samples. See Examples 2, 3, and 5. These examples demonstrate the effects of HCPP on release force, and these effects would be expected even when silicone gum is replaced with silicone oil.

What is claimed is:

1. A multilayer polymeric film comprising:
   (a) a core layer comprising a thermoplastic polymer, the core layer having a first side and a second side, and the thermoplastic polymer of the core layer being selected from the group consisting of ethylene homopolymer, propylene homopolymer, butene-1 polymer, propylene-ethylene copolymer, and propylene-butene-1 copolymer;
   (b) a functional layer which is printable or sealable or treatable fur printing or sealing on the first side of the core layer, the functional layer comprising a film-forming polymer selected from the group consisting of (i) a homopolymer of ethylene or propylene, (ii) a copolymer of ethylene, propylene, butylene, or an olefin having from 5 to 10 carbon atoms, (iii) a terpolymer of ethylene, propylene, butylene, or an olefin having from 5 to 10 carbon atoms, and (iv) a blend thereof; and
   (c) an additional layer on the second side of the core layer comprising (i) a highly crystalline polypropylene having a decalin solubles content of about 1 to about 5% by weight, and meso pentads of equal to or greater than 85.00, as measured by $^{13}C$ NMR spectroscopy, (ii) from about 0.1% to about 0.5% by weight of fully cross-linked antiblock particles, and (iii) from about 0.1% to about 2% by weight of silicone oil.

2. The multilayer polymeric film of claim 1, wherein said thermoplastic polymer of said core layer is a polypropylene homopolymer.

3. The multilayer polymeric film of claim 1, wherein said core layer comprises an antistatic agent selected from the group consisting of: (i) glycerol monostearate and (ii) a blend of glycerol monostearate and tertiary amine.

4. The multilayer polymeric film of claim 1, wherein said fully cross-linked antiblock particles are fully crossedlinked polysiloxane.

5. The multilayer polymeric film of claim 4, wherein the fully crosslinked polysiloxane is polymethylsilsesquioxane spheres having an average particle size of from about 2 $\mu m$ to about 6 $\mu m$.

6. The multilayer polymeric film of claim 1, wherein said functional layer comprises an ethylene homopolymer having a density of about 0.91 to about 0.96 g/cm³, an ethylene-propylene copolymer in which the ethylene content is about 2 to about 10% by weight based upon the total weight of the copolymer, or an ethylene-propylene-butylene terpolymer in which the ethylene content is about 0.5 to about 7 weight % ethylene and about 5 to about 30 weight % butylene, each based upon the total weight of the terpolymer.

7. The multilayer polymeric film of claim 1, wherein the silicone oil is polydimethylsiloxane fluid having a viscosity of about 1,000 cs to about 100,000 cs.

8. The multilayer polymeric film of claim 1, wherein the highly crystalline polypropylene has meso pentads of 85.00 to about 96%, as measured by $^{13}$C NMR spectroscopy.

9. A cold seal release film comprising;

(a) a core layer comprising a thermoplastic polymer, the core layer having a first side and a second side, and the thermoplastic polymer of the core layer being selected from the group consisting of ethylene homopolymer, propylene homopolymer, butene-1 polymer, propylene-ethylene copolymer, and propylene-butane-1 copolymer;

(b) a functional layer which is printable or sealable or treatable for printing or sealing on the first side of the core layer, the functional layer comprising a film-forming polymer selected from the group consisting of (i) a homopolymer of ethylene or propylene, (ii) a copolymer of ethylene, propylene, butylene, or an olefin having from 5 to 10 carbon atoms, (iii) a terpolymer of ethylene, propylene, butylene, or an olefin having from 5 to 10 carbon atoms, and (iv) a blend thereof; and (c) an additional layer on the second side of the core layer comprising (i) a highly crystalline polypropylene having a decalin solubles content of about 1 to about 5% by weight, and meso pentads of equal to or greater than 85.00, as measured by $^{13}$C NMR spectroscopy, (ii) fully cross-linked antiblock particles, and (iii) silicone oil.

10. A process for producing a multilayer polymeric film comprising:

(a) coextruding a core layer comprising a thermoplastic polymer, a functional layer which is printable or scalable or treatable for printing or sealing, and an additional layer comprising (i) a highly crystalline polypropylene having a decalin solubles content of about 1 to about 5% by weight, and meso pentads of equal to or greater than 85.00, as measured by $^{13}$C NMR spectroscopy, (ii) fully cross-linked antiblock particles, (iii) and silicone oil;

(b) cooling the coextruded film; and (c) optionally orienting the film in at least the machine and/or transverse directions, wherein the thermoplastic polymer of the core layer is selected from the group consisting of ethylene homopolymer, propylene homopolymer, butene-1 polymer, propylene-ethylene copolymer, and propylene-butene-1 copolymer, and the functional layer comprises a film-forming polymer selected from the group consisting of (i) a homopolymer of ethylene or propylene, (ii) a copolymer of ethylene, propylene, butylene, or an olefin having from 5 to 10 carbon atoms, (iii) a terpolymer of ethylene, propylene, butylene, or an olefin having from 5 to 10 carbon atoms, and (iv) a blend thereof.

* * * * *